US010197887B2

(12) United States Patent
Enta

(10) Patent No.: US 10,197,887 B2
(45) Date of Patent: Feb. 5, 2019

(54) ACTUATOR, CAMERA MODULE, AND CAMERA MOUNTED DEVICE

(71) Applicant: Yohei Enta, Tokyo (JP)

(72) Inventor: Yohei Enta, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/577,554

(22) PCT Filed: May 26, 2016

(86) PCT No.: PCT/JP2016/002555
§ 371 (c)(1),
(2) Date: Nov. 28, 2017

(87) PCT Pub. No.: WO2016/194345
PCT Pub. Date: Dec. 8, 2016

(65) Prior Publication Data
US 2018/0173080 A1  Jun. 21, 2018

(30) Foreign Application Priority Data

May 29, 2015 (JP) .................. 2015-110562
Jun. 26, 2015 (JP) .................. 2015-129096

(51) Int. Cl.
G03B 5/00 (2006.01)
H04N 5/232 (2006.01)
(Continued)

(52) U.S. Cl.
CPC ............ *G03B 5/00* (2013.01); *H02K 41/0354* (2013.01); *H04N 5/2253* (2013.01);
(Continued)

(58) Field of Classification Search
CPC .................. G02B 27/646; H04N 5/23287
See application file for complete search history.

(56) References Cited

U.S. PATENT DOCUMENTS 9,426,362 B2 *  8/2016  Tang ................. H04N 5/23232
9,798,159 B2 * 10/2017  Moriya ............... G02B 27/646
2010/0098394 A1 *  4/2010  Ishihara ............. G02B 27/646
396/55

FOREIGN PATENT DOCUMENTS

JP   2004-153503 A   5/2004
JP   2008-065163 A   3/2008
(Continued)

OTHER PUBLICATIONS

International Search Report from International Application No. PCT/JP2016/002555 dated Aug. 23, 2016.

Primary Examiner — Noam Reisner
(74) Attorney, Agent, or Firm — Brundidge & Stanger, P.C.

(57) ABSTRACT

Provided is an actuator capable of efficiently detecting the vibration of a driven part which is a movable body (an imaging module, for example), over a wide range even with a narrow mounting space. A fixed body in this actuator comprises: a gyroscope for detecting the vibration of the fixed body; a first Hall element for detecting a first position of a lens part associated with a movement in a first direction orthogonal to the optical axis of the lens part; and a second Hall element for detecting a second position associated with a movement in a second direction orthogonal to the first direction. The vibration of the driven part is corrected on the basis of the vibration of the fixed body detected by the gyroscope and the positions detected by the first and second Hall elements.

13 Claims, 11 Drawing Sheets

(51) Int. Cl.
*H04N 5/225* (2006.01)
*H02K 41/035* (2006.01)

(52) U.S. Cl.
CPC ........... *H04N 5/2257* (2013.01); *H04N 5/232* (2013.01); *G03B 2205/0069* (2013.01)

(56) References Cited

FOREIGN PATENT DOCUMENTS

| | | | |
|---|---|---|---|
| JP | 2010-197519 | A | 9/2010 |
| JP | 2014-010287 | A | 1/2014 |

\* cited by examiner

ACTUATOR, CAMERA MODULE, AND CAMERA MOUNTED DEVICE

TECHNICAL FIELD

The present invention relates to a shake-correcting actuator, and to a camera module and a camera-mounted device having a shake-correcting function.

BACKGROUND ART

In general, a small-sized camera module is mounted in mobile terminals such as smartphones. Such a module, in many cases, has an auto-focusing function for automatically focusing at the time of capturing a subject and a shake-correcting function (OIS: Optical Image Stabilization) for reducing irregularities of an image by correcting shake (vibration) caused at the time of capturing an image.

As a shake-correcting method, a module tilt method has been known in which an imaging module is integrally tilted (see e.g. Patent Literature (hereinafter, referred to as "PTL") 1 and PTL 2). The imaging module is a module having a lens part and an imaging device (for example, a charge coupled device (CCD)), which may be provided with an auto-focusing actuator.

In the following descriptions, the auto-focusing actuator is referred to as "AF actuator," and a shake-correcting actuator is referred to as "OIS actuator."

In order to correct hand-shake during capturing an image by using the OIS actuator, two axes of reference orthogonal to each other in a plane perpendicular to an optical axis of the lens part (for example, X- and Y-axes when the optical axis is defined as a Z-axis) are defined, and for the purpose of detecting angular velocities of rotation about both the X- and Y-axes, two gyro sensors each having a detection axis parallel with the X- or Y-axis are required. These gyro sensors are integrally provided to the imaging module together with the lens part in a manner as disclosed, for example, in PTL 1. In addition, in PTL 1, a gyro sensor having a detection axis parallel with an optical axis is mounted on a substrate on which the imaging module is mounted.

FIG. 1 is an external view of an exemplary camera module of a traditional module tilt type. FIG. 2 is an exploded perspective view of the exemplary camera module of a traditional module tilt type.

As illustrated in FIGS. 1 and 2, camera module 2 of a traditional module tilt type includes fixing part 21, movable part 22, elastic supporting part 23, imaging module 24, and shake detection part 25. The OIS actuator is composed of fixing part 21, movable part 22, and elastic supporting part 23.

Fixing part 21 includes base member 211, coil part 212, and OIS print wiring board 213. Coil part 212 is disposed on base member 211. OIS print wiring board 213 feeds power to coil part 212, and outputs a detection signal of shake detection part 25 to a control part.

Movable part 22 includes yoke 221, magnet part 222, top plate 223, and module guide 224. Yoke 221 and magnet part 222 are disposed in respective housing sections formed in top plate 223. Module guide 224 is fixed to top plate 223. Imaging module 24 is fixedly disposed in a space sandwiched between a pair of module guides 224.

Elastic supporting part 23 has a biaxial gimbal mechanism, and movable part 22 (top plate 223) is fixed to an outer gimbal. Elastic supporting part 23 is disposed at an approximate center of base member 211 in a floating fashion, and fixed by stopper 231. Elastic supporting part 23 supports movable part 22 such that movable part 22 can rotationally sway around the X-axis and the Y-axis orthogonal to the optical axis (Z axis), that is, elastic supporting part 23 supports movable part 22 such that movable part 22 can be tilted.

Shake detection part 25 is composed of a gyro sensor that detects the angular velocity of imaging module 24, for example. Shake detection part 25 is fixed to a side surface of module guide 224 of movable part 22. The detection signal of shake detection part 25 is output to the control part through OIS print wiring board 213 that constitutes fixing part 21.

An OIS voice coil motor (VCM) is composed of coil part 212 and magnet part 222. That is, when a current flows through coil part 212, a Lorentz force is generated at coil part 212 by interaction between the magnetic field of magnet part 222 and the current flowing through coil part 212 (Fleming's left hand rule). Since coil part 212 is fixed, a reactive force is exerted on magnet part 222. This reactive force is the driving force of the OIS voice coil motor. Movable part 22 rotationally sways until the driving force of the OIS voice coil motor and the restoration force (returning force) of elastic supporting part 23 become equivalent to each other. In this manner, a shift of the optical axis due to hand shake is corrected, and the orientation of the optical axis is kept at an orientation.

CITATION LIST

Patent Literature

PTL 1
Japanese Patent Application Laid-Open No. 2014-10287
PTL 2
Japanese Patent Application Laid-Open No. 2004-153503

SUMMARY OF INVENTION

Technical Problem

As disclosed in PTL 1, it has been common in the traditional module tilt type that shake detection part 25, which is a gyro sensor, required for hand shake correction is fixed to the side surface of movable part 22 and detects tilt of imaging module 24.

In recent years, along with the thickness reduction and miniaturization of mobile terminals, camera modules have been further miniaturized and the mounting spaces of camera modules has been reduced, and accordingly, it has been desired to make the external shape of movable part 22 smaller to efficiently secure the motion space of the movable part even in a limited mounting space.

An object of the present invention is to provide an actuator, camera module, and camera-mounted device in which the shake of a driven part (for example, imaging module) that is a movable part capable of efficiently moving widely even in a narrow mounting space can be detected. In particular, this object is to provide the actuator, camera module, and camera-mounted device in which the external shape of the driven part (for example, imaging module) is made smaller and the motion space of the driven part is broadened accordingly, so that detection of larger shake can be achieved even in the narrow mounting space.

Solution to Problem

An actuator according to the present invention is configured to correct shake by tilting a driven part with a driving force of a voice coil motor including a coil part and a magnet part, the actuator including: a fixing part which includes a base member, wherein one of the coil part and the magnet part is disposed on the base member peripherally with respect to the driven part; a movable part including a frame-shaped holding member having a surface which faces away from the base member and on which the driven part is placed, the movable part being a part in which the other one of the coil part and the magnet part is disposed peripherally with respect to the driven part and on a surface of the frame-shaped holding member facing the base member; and a supporting part disposed to the base member, and configured to support the movable part such that the movable part is tiltable with respect to the fixing part, in which: the fixing part is provided with a gyro sensor configured to detect shake of the fixing part, a first Hall element configured to detect a first position resulted from a movement in a first direction orthogonal to an optical axis of a lens part provided to the driven part, and a second Hall element configured to detect a second position resulted from a movement in a second direction orthogonal to the first direction; and shake of the driven part is corrected based on shake of the fixing part detected by the gyro sensor and on a detection position obtained by the first and the second Hall elements.

A camera module according to the present invention is configured to include: the above actuator; and an imaging module including a lens part and an imaging device, and bonded to the holding member as the driven part.

A camera-mounted device according to the present invention is configured to be an information device or a transporting device, and to include the above camera module.

Advantageous Effects of Invention

According to the present invention, shake of a driven part (for example, imaging module) that is a movable part capable of efficiently moving widely even in a narrow mounting space can be detected In particular, the external shape of the driven part (for example, imaging module) is made smaller and the motion space of the driven part is broadened accordingly, so that detection of larger shake can be achieved even in the narrow mounting space.

DESCRIPTION OF EMBODIMENTS

In the following, an embodiment of the present invention is described in detail with reference to the drawings.

Figure 3A:
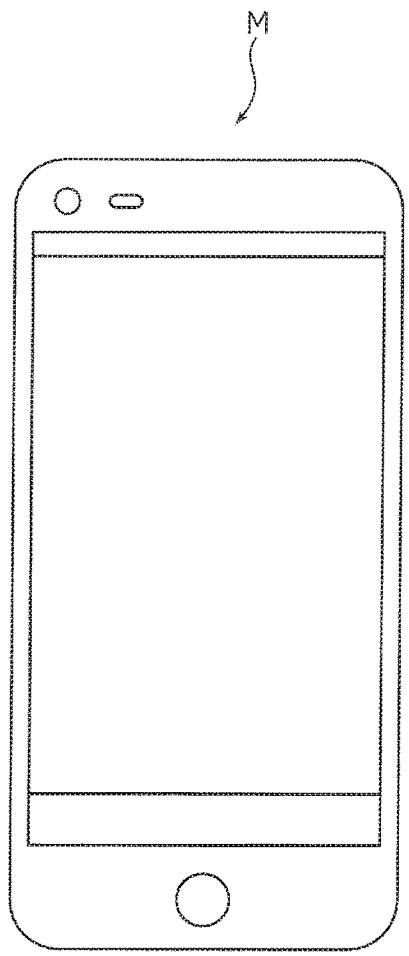
FIGS. 3A and 3B illustrate a smartphone in which a camera module according to an embodiment of the present invention is mounted.
Figure 3B:
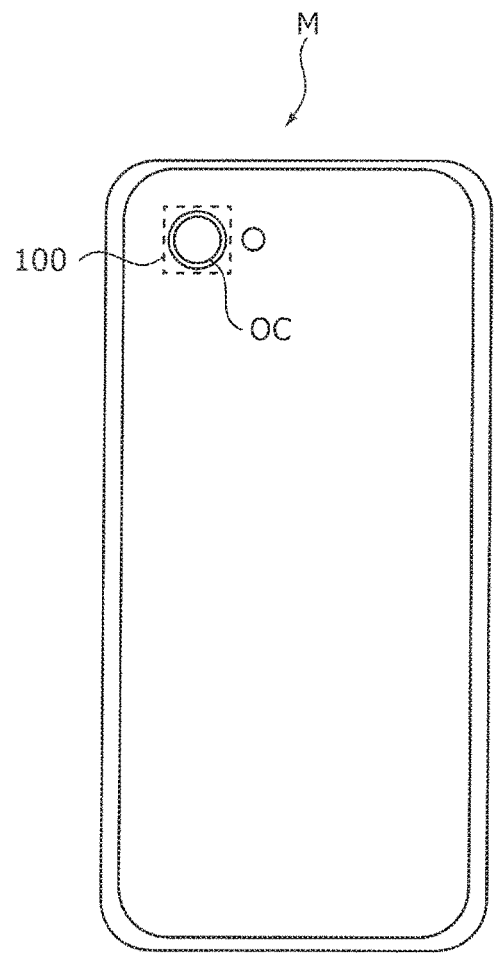

FIGS. 3A and 3B illustrate smartphone M in which camera module 100 according to an embodiment of the present invention is mounted. FIG. 3A is a front view of smartphone M, and FIG. 3B is a rear view of smartphone M.

For example, smartphone M is provided with camera module 100 as a back side camera OC. Camera module 100 has an auto-focusing function and a hand-shake correction function, and can capture an image without image blurring by automatically performing focusing at the time of capturing a subject and by correcting hand shake (vibration) caused at the time of capturing an image. The hand-shake correction function of camera module 100 is of a module tilt type. The module tilt type is advantageous in that no deformation is caused at four corners of the screen.

Figure 4:
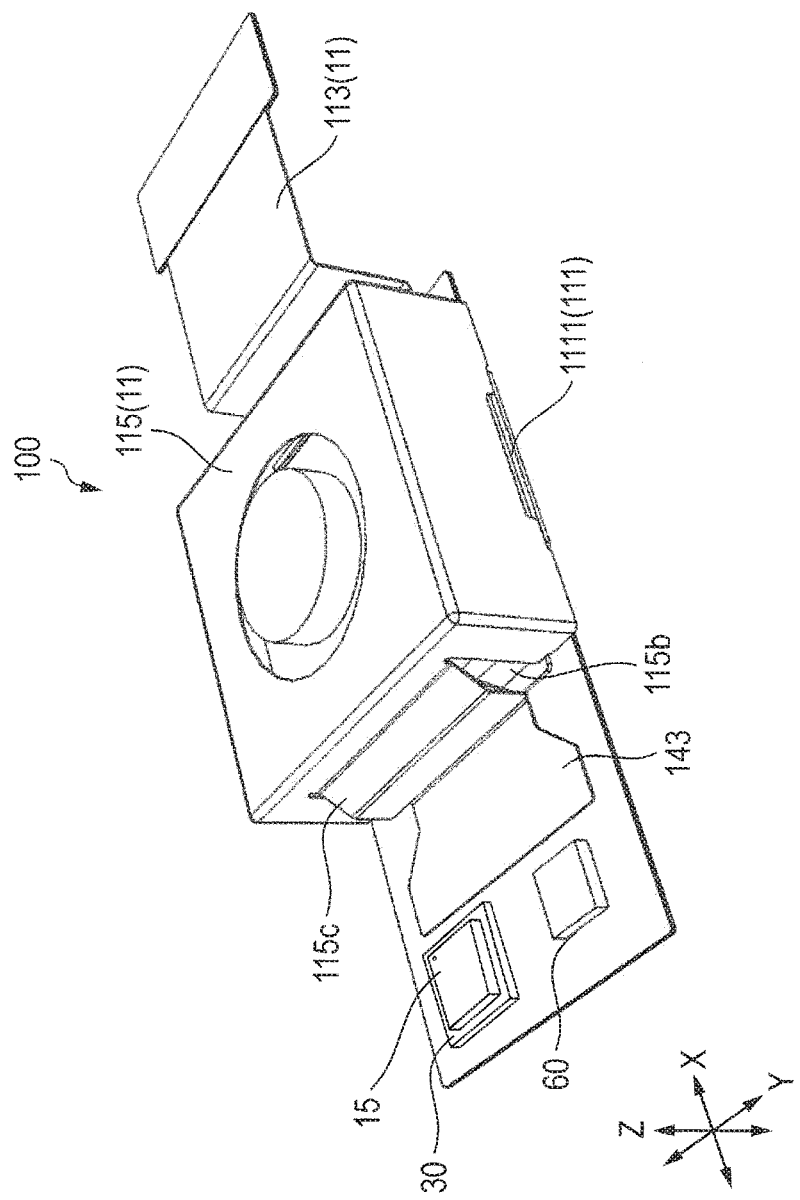
FIG. 4 is a perspective view of an external appearance of the camera module.
Figure 5:
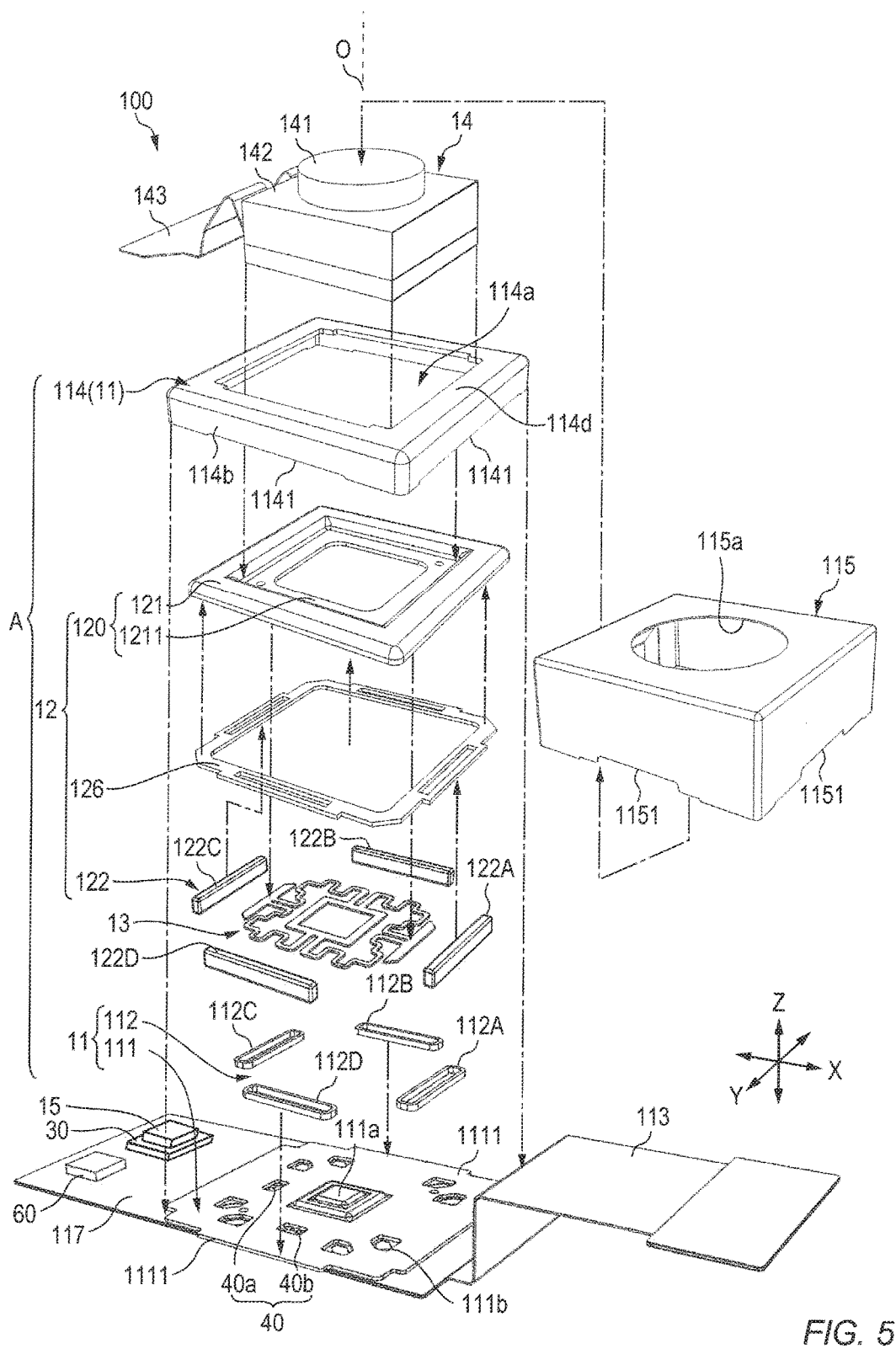
FIG. 5 is an exploded perspective view of the camera module.
Figure 6:
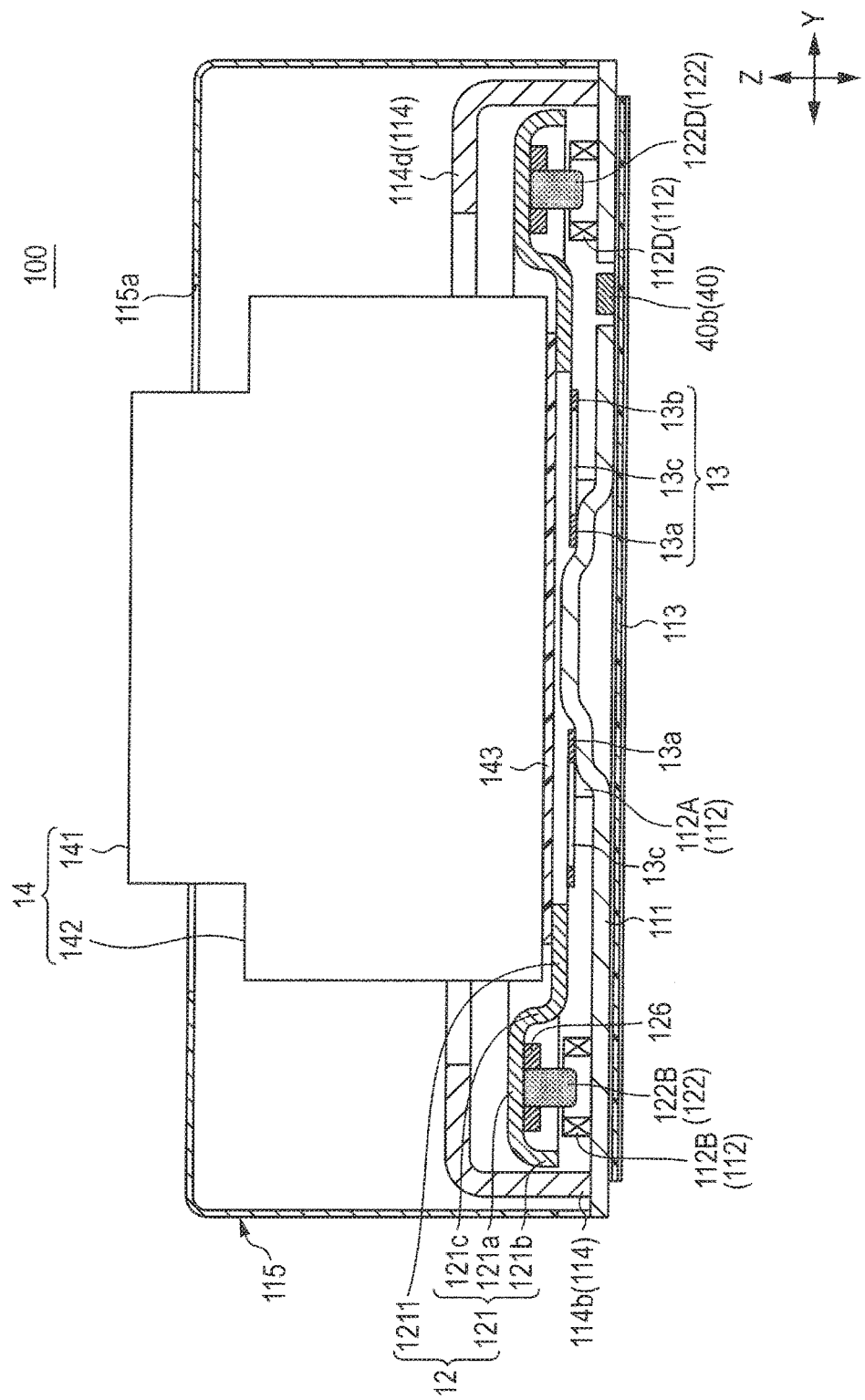
FIG. 6 is a sectional view along the Y direction of the camera module.
Figure 7:
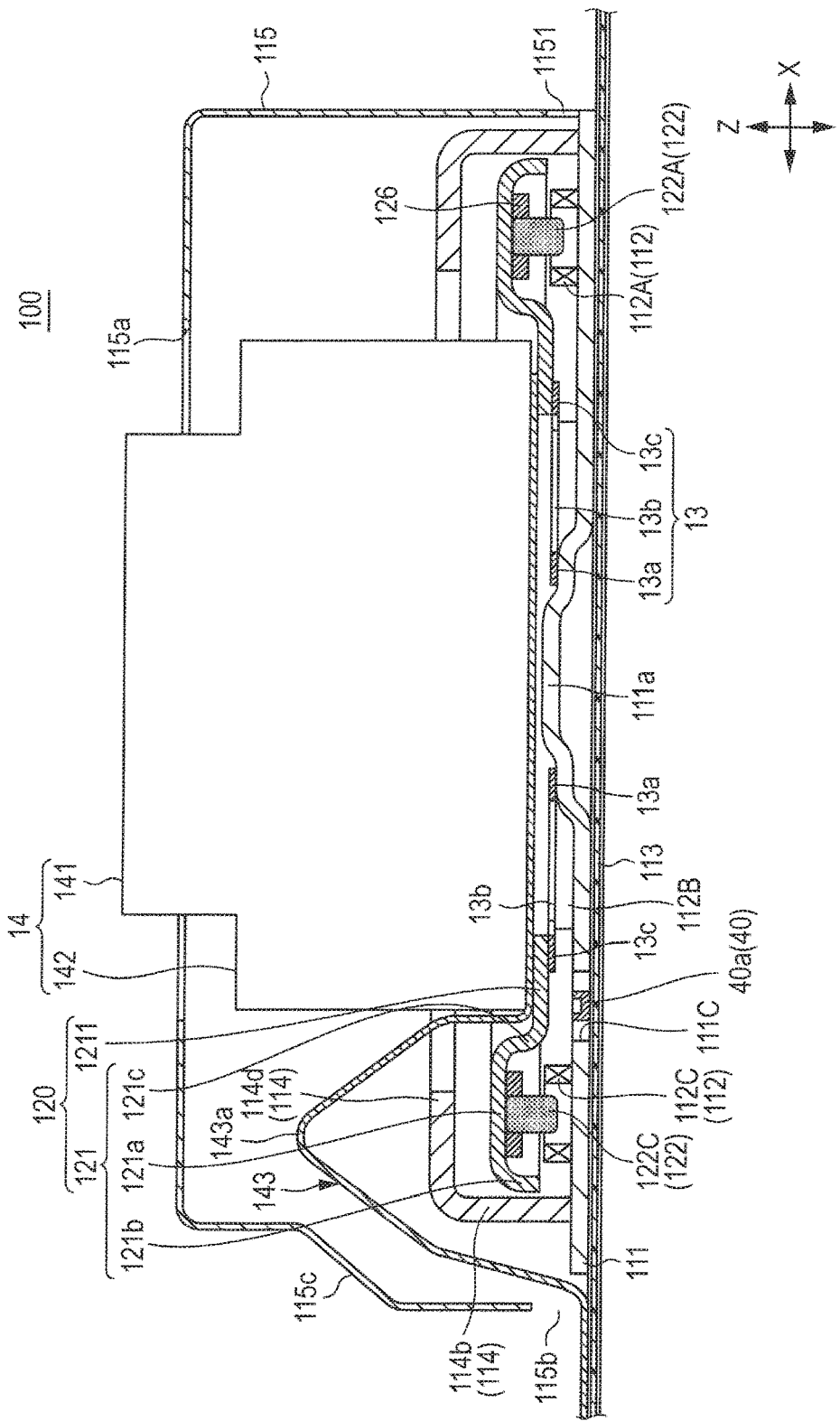
FIG. 7 is a sectional view along the X direction of the camera module.

FIG. 4 is a perspective view of an external appearance of camera module 100. FIG. 5 is an exploded perspective view of camera module 100. FIG. 6 is a sectional view of camera module 100 along the Y direction. FIG. 7 is a sectional view of camera module 100 along the X direction. Note that, FIGS. 6 and 7 particularly illustrate a magnetic circuit part that is a voice coil motor.

Descriptions will here be made with an orthogonal coordinate system (X, Y, Z) as illustrated in FIGS. 4 to 7. Camera module 100 is mounted such that the vertical direction (or horizontal direction) is the X direction, the horizontal direction (or vertical direction) is the Y direction, and the front-rear direction is the Z direction (optical axis direction) at the time of actually capturing an image with smartphone M.

As illustrated in FIGS. 4 to 7, camera module 100 includes fixing part 11, movable part 12, elastic supporting part 13, imaging module (driven part) 14, shake detection part (gyro sensor) 15, intermediary substrate 30, displacement detection part (tilt detection part) 40, driver IC 60, and the like. OIS actuator A is composed of fixing part 11, movable part 12, elastic supporting part 13, and shake detection part (gyro sensor) 15. OIS actuator A may further include intermediary substrate 30. In OIS actuator A, shake correction is implemented with use of the driving force of an OIS voice coil motor including coil part 112 and magnet part 122.

Fixing part 11 is fixed so as to be unmovable when mounted in smartphone M. Fixing part 11 supports movable part 12 via elastic supporting part 13 such that movable part 12 is movable. Fixing part 11 includes base member 111, coil part 112, OIS print wiring board 113, skirt member (cover member) 114, main body cover member (hereinafter referred to as "cover member") 115, and rigid flexible printed wiring board (or rigid-flexible printed circuits) (hereinafter collectively referred to as "rigid FPC")) 117.

Rigid FPC 117 includes a rigid portion, as mentioned above, which is formed of a hard material, such as glass epoxy, and, at a part to be bent when rigid FPC 117 is assembled into and/or to be repeatedly bent, rigid FPC 117 also includes a bending portion in which a bending material (polyimide) for flexible printed circuits (FPC) is used. In this embodiment, rigid FPC 117 is formed as a substrate that is composed of a glass epoxy substrate attached to the FPC, and that has the same bendability as the FPC while having a greater rigidity than the FPC. In this way, in rigid FPC 117, the rigid portion exhibits an excellent property suitable for mounting of components by virtue of its rigidity equivalent to the rigidity of a rigid substrate, and the bending portion allows three-dimensional mounting in equipment in which camera module 100 including rigid FPC 117 is mounted (in this case, smartphone) since the bending portion has the same bendability as the FPC, that is, has a greater bendability while a less rigidity than the rigid substrate. In this way, the mounting density in a smartphone is increased.

Base member 111 is disposed on rigid FPC 117. Driver IC 60 is mounted on rigid FPC 117 at a position distant from base member 111, and shake detection part 15, which is described below, is mounted on rigid FPC 117 via intermediary substrate 30 at a position distant from base member 111. In addition, displacement detection part 40 to be exposed within a region where base member 111 is disposed is mounted on rigid FPC 117.

Driver IC (driving part) 60 supplies electricity to coil part 112 by control of a control part to move movable part 12, that is, drive imaging module 14 attached to movable part 12.

Base member 111 is a member formed of a metal material in a substantially rectangular shape, and is disposed on rigid FPC 117. By forming base member 111 of a metal material, the strength of base member 111 is made greater in comparison with a case where base member 111 is formed of a resin. Thus, the thickness of base member 111 can be reduced, and accordingly, the height reduction of camera module 100 can be achieved.

Base member 111 includes, at the center thereof, protruding part 111a having a truncated pyramid shape for fixing elastic supporting part 13. Base member 111 includes, at positions around protruding part 111a, power feeding parts 111b in the form of pads for supplying electricity to coil part 112. In base member 111, displacement detection part 40 is disposed in cutout region 111C provided at a position other than the positions of power feeding parts 111b around protruding part 111a.

Displacement detection part 40 is configured to detect contactlessly a position of movable part 12 attached to fixing part 11 via elastic supporting part 13, that is, a position of imaging module 14, and a detected signal is connected to a circuit of rigid FPC 117. The shake of movable part 12, that is, imaging module 14 is corrected by sensing movable part 12, that is, imaging module 14 by use of displacement detection part 40 without employing a configuration in which an imaging module is sensed by a gyro sensor as shake detection part 15 provided on the imaging module side and without providing a gyro sensor on the imaging module side.

Displacement detection part 40 is composed, for example, of a Hall element and the like. In this embodiment, displacement detection part 40 is composed of two Hall elements (first and second Hall elements) 40a and 40b that are a magnetic position detection part. Hall elements 40a and 40b constituting displacement detection part 40 are disposed respectively in such a manner as to be spaced apart from and to face two (permanent magnets 122C and 122D) of four pieces of permanent magnets 122A to 122D constituting magnet part 122 as described below. Each of Hall elements 40a and 40b is disposed transversely to the direction of from the N-pole to the S-pole of permanent magnet 122C or 122D. To be specific, Hall elements 40a and 40b are mounted on base member 111 respectively along the directions of the X- and Y-axes of coil part 112 and alongside of tilt coils 112C and 112D of coil part 112. In this embodiment, Hall elements 40a and 40b are disposed on the center (optical axis) side of tilt coils 112C and 112D. A configuration is adopted in which permanent magnets 122C and 122D are disposed inside tilt coils 112C and 112D, respectively, and accordingly Hall elements 40a and 40b are located to face permanent magnets 122C and 122D, respectively.

To be more specific, one Hall element 40a is disposed frontward in the first direction (X direction, for example, front-rear direction in this embodiment) with respect to the optical axis, and detects the magnetic force of permanent magnet 122C that faces Hall element 40a. Hall element 40a thus detects the first position resulted from the movement (sway) in the first direction (X direction, front-rear direction). For example, Hall element 40a detects a position of permanent magnet 122C that is turnable about the Y-axis, or movable in the X-axis direction by virtue of deformation of elastic supporting part 13 (inner gimbal 13b), and this position may be defined as the first position.

The other Hall element 40b is disposed rightward in the second direction (Y direction, for example, left-right direction in this embodiment) with respect to optical axis O, and detects the magnetic force of permanent magnet 122D that faces Hall element 40b. Hall element 40b thus detects the second position resulted from the movement (sway) in the second direction (Y direction, left-right direction). For example, Hall element 40b detects a position of permanent magnet 122D that is turnable about the X-axis, or movable in the Y-axis direction by virtue of deformation of elastic supporting part 13 (inner gimbal 13b), and this position may be defined as the second position. The movement amount of permanent magnet 122C in the direction of X- or Y-axis detected by Hall element 40a or 40b may be defined, for example, as a position of permanent magnet 122C tilting in relation to the horizontal direction of when permanent magnet 122C rotates (sways) about the X- or Y-axis, and/or as a position of permanent magnet 122C or 122D moved by this rotation in the direction of X- or Y-axis. For example, the first position detected by first Hall element 40a and the second position detected by second Hall element 40b are a position in imaging module 14 that is rotatable about the X- and Y-axes, and is also elastically supported to be movable in the directions of X-, Y-, and Z-axes.

In this way, Hall element 40a can detect the movement amount of permanent magnet 122C in the X-axis direction, and Hall element 40b can detect the movement amount of permanent magnet 122D in the Y-axis direction. That is, Hall elements 40a and 40b can detect the movement amounts of the imaging module in the directions of X- and Y-axes. Hall elements 40a and 40b thus detect the movement amounts of the imaging module in the directions of X- and Y-axes, that is, the movement of the imaging module in a plane orthogonal to the optical axis.

In this way, on the basis of the shake of rigid FPC 117 (fixing part 11 or camera module 100 itself) detected by shake detection part (gyro sensor) 15 and a detection position obtained by Hall elements 40a and 40b, the control part can move movable part 12 (imaging module 14) by means of driver IC 60 to a position corresponding to the movement amounts of the imaging module in the directions of X- and Y-axes, and/or to a precise corrected position, that is, a reference position, so as to correct the shake of imaging module 14.

Hall elements 40a and 40b can also detect an offset due to the dead weight of imaging module 14 (dead weight sagging) or an offset due to the reactive force of the FPC of imaging module 14 of when movable part 12 is attached to fixing part 11, since Hall elements 40a and 40b (displacement detection part 40) can detect the movement amounts of the imaging module in the directions of X- and Y-axes. In this manner, in camera module 100, an offset position of imaging module 14 is detected and corrected using displacement detection part 40, so that imaging module 14 can be precisely disposed without being tilted.

In addition, base member 111 includes, at the middle portions of four sides constituting the peripheral edge of base member 111, protruding side portions 1111 for positioning cover member 115 and skirt member 114 during fixation thereof. Protruding side portions 1111 are respectively engaged with cutouts 1141 and 1151 of skirt member 114 and cover member 115 when skirt member 114 and cover member 115 are attached to base member 111. In particular, by virtue of engagement of cutout 1141 with protruding side portion 1111, skirt member 114 is fit at the outside of the peripheral edge of base member 111 and fixedly positioned. As for cover member 115, cutout 1151 is engaged with protruding side portion 1111 of base member 111, and cover member 115 is fit at the outside of the outer peripheral surface of skirt member 114. In this way, cover member 115 are also positioned by means of protruding side portions 1111 of base member 111.

Coil part 112 is composed of four tilt coils 112A to 112D and is disposed at base member 111 to surround protruding part 111*a*. Coil part 112 (tilt coils 112A to 112D) is disposed such that the winding axis of each coil is oriented in the direction in which base member 111 and yoke (holding member) 120 face each other (in this case, in the Z direction). Power is fed to coil part 112 (tilt coils 112A to 112D) through power feeding parts 111*b*.

Tilt coils 112A and 112C face each other in the X direction, and are used to rotationally sway (θY) movable part 12 about the Y-axis (for example, to move movable part 12 in the first direction). Tilt coils 112B and 112D face each other in the Y direction, and are used to rotationally sway (θX) movable part 12 about the X-axis (for example, to move movable part 12 in the second direction).

OIS print wiring board 113 includes a power-source line (not illustrated) for feeding power to coil part 112. OIS print wiring board 113 is fixed on the bottom surface of base member 111, and the power-source line is electrically connected with power feeding parts 111*b* of base member 111.

Skirt member 114 is a frame-shaped member composed of four walls 114*b* coupled with each other in a rectangular shape, and includes reception port 114*a* for imaging module 14. Skirt member 114 includes cutouts 1141 at positions corresponding to protruding side portions 1111 of base member 111, that is, at respective middle portions of lower ends of walls 114*b* of skirt member 114. Skirt member 114 includes, at upper portions of respective walls 114*b*, restriction parts 114*d* that slightly protrude from the respective upper portions toward the inside and form a rectangular frame, and restriction parts 114*d* prevent movable part 12 disposed in the frame, that is, in reception port 114*a* of skirt member 114 from being excessively tilted.

After movable part 12 is attached to base member 111 through elastic supporting part 13, skirt member 114 is fixed by being fit at the outside of the peripheral edge of base member 111. Movable part 12 is set between base member 111 and skirt member 114.

Cover member 115 is a capped rectangular cylindrical member, which includes opening (opened portion) 115*a* in the cap at the top surface of the cylindrical member. Opened portion 115*a* in cover member 115 allows lens part 141 of imaging module 14 to face outside. Cover member 115 includes, at the lower end of its cylindrical peripheral wall, cutouts 1151 formed at positions corresponding to protruding side portions 1111 of base member 111.

After imaging module 14 is mounted to OIS actuator A, cover member 115 is fit at the outside of skirt member 114 and cutouts 1151 are engaged with protruding side portions 1111 of base member 111, so that cover member 115 is fixed to base member 111. Drawing port 115*b* for imaging-module print wiring board 143 to be pulled to the outside is formed at the one side surface of cover member 115. A part of one side surface of cover member 115 is processed so as to form outwardly projecting hood part 115*c*, and drawing port 115*b* is thus formed below hood part 115*c*.

Movable part 12 rotationally sways around the X-axis and the Y-axis with respect to fixing part 11. Movable part 12 includes yoke (holding member) 120, magnet part 122, and positioning plate 126. When imaging module 14 is mounted to OIS actuator A, yoke 120 directly holds imaging module 14. Imaging module 14 is bonded on the top surface of yoke 120 with a double-sided tape, resin adhesive agent, or the like, for example. With this construction, even without using positioning members such as the module guide disclosed in PTL 1, imaging module 14 can be fixed to yoke 120 with use of a jig while setting the position of imaging module 14 with high accuracy.

Yoke 120 is a rectangular frame-shaped member formed of a magnetic material, and includes rectangular frame-shaped yoke main body 121 (holding-part main body) and flat frame-shaped holding frame portion 1211 that is provided inside the frame shape of yoke main body 121 and fixes imaging module 14.

Yoke main body 121 includes flat frame-shaped top plate portion 121*a* composed of four flat plates which are coupled with each other in a rectangular shape. Magnet part 122 is fixed on the underside of top plate portion 121*a*. Yoke main body 121 includes outside droop portion 121*b* along the outer peripheral edge of top plate portion 121*a* (in particular, outer edge of each flat plate composing top plate portion 121*a*), outside droop portion 121*b* being formed in such a manner as to downwardly protruding and droop down. In addition, yoke main body 121 includes inside droop portion 121*c* along the inner peripheral edge of top plate portion 121*a* (in particular, inner edge of each flat plate composing top plate portion 121*a*), inside droop portion 121*c* being formed in such a manner as to downwardly protruding and droop down. That is, the cross-sectional shape of one side of yoke main body 121 has a recessed shape open toward base member 111, that is, a downwardly open U-shape. Top plate portion 121*a* that forms the bottom surface inside this recessed shape is located more distant from base member 111 than holding frame portion 1211 is from base member 111. In addition, the outer peripheral edge of holding frame portion 1211 is connected to the lower end of inside droop portion 121*c* of yoke main body 121. The bottom surface of imaging module 14 is fixed on the top surface of holding frame portion 1211 (a part of the top surface of yoke 120) with a double-sided tape or resin adhesive agent.

As described above, in yoke 120, top plate portion 121*a* of yoke main body 121 to which magnet part 122 is fixed is located, by way of inside droop portion 121*c*, more peripherally and higher than holding frame portion 1211 on which imaging module 14 is fixed. That is, top plate portion 121*a* is disposed at a position around holding frame portion 1211 and more distant from base member 111 than holding frame portion 1211 is from base member 111 in the Z direction.

With this construction, a step by which holding frame portion 1211 is made closer to base member 111 than top plate portion 121*a* is to base member 111 is formed between holding frame portion 1211 and top plate portion 121a, and a recessed portion is formed in the center of entire yoke 120, in which imaging module 14 is fixed. This yoke 120 prevents the magnetic interference to imaging module 14 caused by the magnetic circuit including magnet part 122 and coil part 112.

Magnet part 122 is composed of four cuboid permanent magnets 122A to 122D corresponding to tilt coils 112A to 112D. Electromagnets may be used in place of permanent magnets. Permanent magnets 122A to 122D have a size which can be put inside tilt coils 112A to 112D.

Permanent magnets 122A to 122D are disposed at the undersides of respective flat plates of yoke 120 such that the magnetization direction is the Z direction, and permanent magnets 122A to 122D are fixed by bonding, for example. In this case, permanent magnets 122A to 122D are fixed via positioning plate 126 formed in such a manner as to allow permanent magnets 122A to 122D to be disposed at predetermined positions. Positioning plate 126 is formed of a magnetic or non-magnetic material, has a shape corresponding to the shape of the underside of top plate portion 121a, and is provided with four slits at positions to which permanent magnets 122A to 122D are disposed. Positioning plate 126 is fixed to the underside of top plate portion 121a with a double-sided tape, adhesive agent, or the like, and permanent magnets 122A to 122D are fitted in the respective slits of positioning plate 126 in such a manner as to make contact with the underside of top plate portion 121a. In this manner, permanent magnets 122A to 122D are positioned and fixed with respect to yoke 120 with high precision (see FIGS. 6 to 8).

In addition, permanent magnets 122A to 122D are located between inside droop portion 121c and outside droop portion 121b of yoke 120. In this case, permanent magnets 122A to 122D face both of inside droop portion 121c and outside droop portion 121b, at positions where permanent magnets 122A to 122D are spaced apart from both of inside droop portion 121c and outside droop portion 121b.

Coil part 112 is located between magnet part 122 and yoke 120 (in particular, yoke main body 121) (see FIGS. 5 and 6). Magnet part 122 is located on the winding axis of winding of coil part 112. The central portion of coil part 112 are opened along the bonding direction of imaging module 14, and magnet part 122 and coil part 112 are respectively disposed to yoke 120 and base member 111 such that magnet part 122 protrudes to the central portion of coil part 112.

To be more specific, tilt coils 112A to 112D are located between outside droop portion 121b and permanent magnets 122A to 122D and between inside droop portion 121c and permanent magnets 122A to 122D. In this manner, the periphery of coil part 112 is covered with yoke 120, so that it is possible to prevent the AF actuator of imaging module 14 from being unfavorably influenced by the magnetic field of the current for energization of coil part 112.

In addition, magnet part 122 and coil part 112, namely the magnetic circuit part including magnet part 122 and coil part 112 are located peripherally (in particular, in the X and Y directions) with respect to the lower end of imaging module 14 and holding frame portion 1211. In other words, the magnetic circuit part including magnet part 122 and coil part 112 is not disposed directly below the lower end of imaging module 14 and holding frame portion 1211. That is, magnet part 122 (permanent magnets 122A to 122D) and coil part 112 (tilt coils 112A to 112D) are disposed on base member 111 peripherally with respect to the lower end of imaging module 14 and holding frame portion 1211 of yoke 120 in the X and Y directions.

Figure 8:
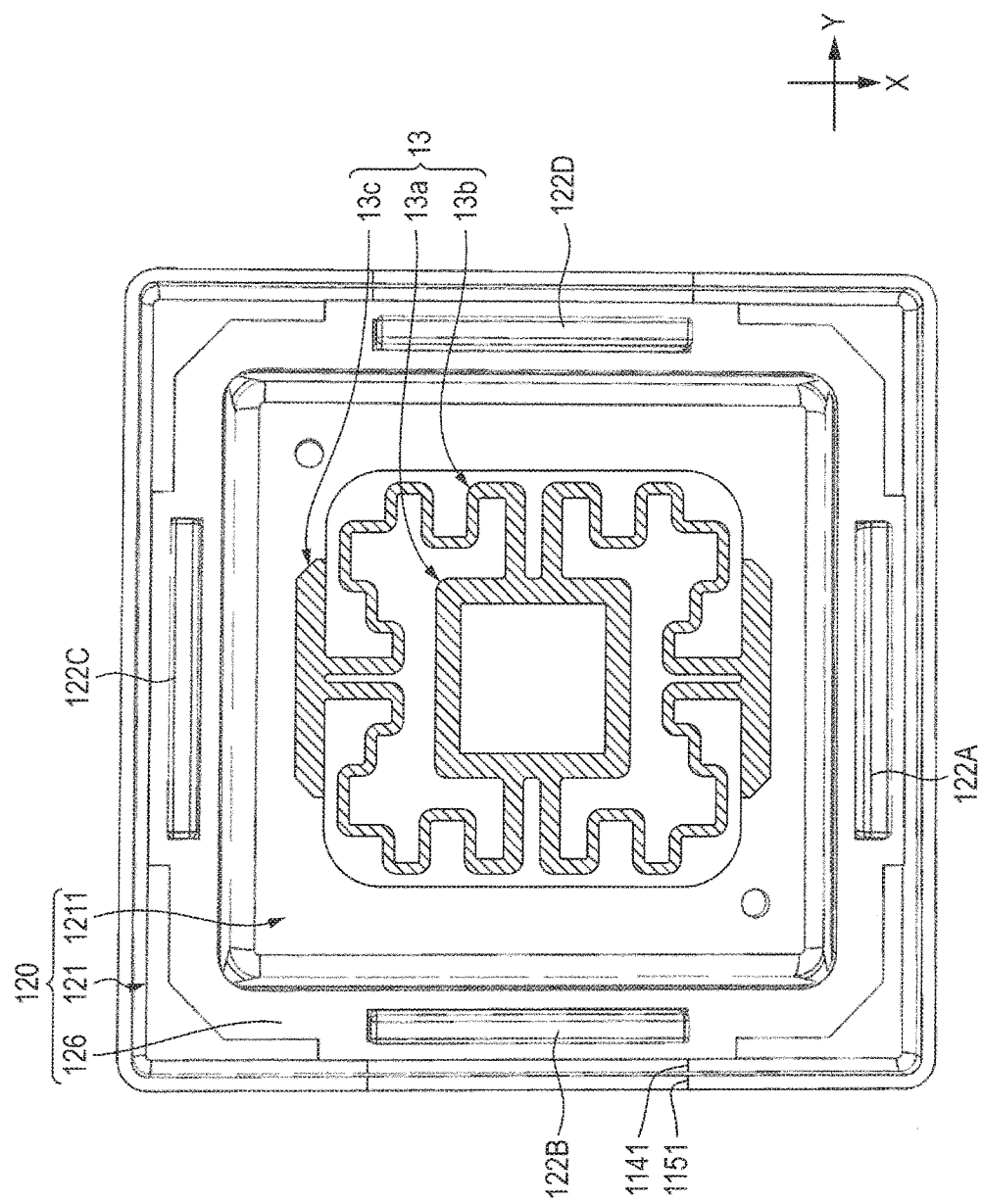
FIG. 8 is a bottom view of a yoke to which an elastic supporting part is attached.

Elastic supporting part 13 is composed of a rectangular member having a biaxial gimbal mechanism (so-called gimbal spring). FIG. 8 is a bottom view of the yoke to which the elastic supporting part is attached, and serves to explain the elastic supporting part.

As illustrated in FIG. 8, elastic supporting part 13 includes center portion 13a and outer gimbal 13c continuously connected with center portion 13a with inner gimbal 13b therebetween. Outer gimbal 13c rotationally sways around the X-axis and the Y-axis. Note that the gimbals that are elastic supporting part 13 are indicated by hatching in an attempt to differentiate them from the other components in FIG. 8. As illustrated in FIG. 8, center portion 13a has a rectangular frame shape, and inner gimbal 13b has a complex curved shape. In this embodiment, outer gimbal 13c includes two long plates which are respectively arranged outside and in parallel with a pair of opposite side portions of center portion 13a. Outer gimbal 13c is connected to one end of inner gimbal 13b at the middle of outer gimbal 13c. In the meantime, the other end of inner gimbal 13b is connected to center portion 13a.

Center portion 13a of elastic supporting part 13 is bonded or welded to protruding part 111a of base member 111 in such a manner as to be fit at the outside of protruding part 111a. As a result, a peripheral portion of elastic supporting part 13 with respect to central portion 13a is located at a predetermined distance above the top surface of base member 111 as illustrated in FIG. 7. In this respect, this predetermined distance serves as a range in which elastic supporting part 13 is movable when elastic supporting part 13 turns around the central axes in the X and Y directions in which elastic supporting part 13 is movable. In addition, as illustrated in FIG. 8, outer gimbal 13c of elastic supporting part 13 is bonded or welded to a pair of parallel side portions on the underside of holding frame portion 1211 of yoke 120. In this manner, movable part 12 is disposed at an approximate center of base member 111 in a floating fashion, so that movable part 12 can rotationally sway about the X- and Y-axes, and also can move in the Z direction in addition to the directions of X- and Y-axes by virtue of deformation of inner gimbal 13b. Since elastic supporting part 13 is fixed to base member 111 by bonding, it is not necessary to provide lock members such as the stopper disclosed in PTL 1. Elastic supporting part 13 is attached via outer gimbal 13c to the underside of holding frame portion 1211, on the top surface of which imaging module 14 is bonded. The distance in the Z direction between elastic supporting part 13 and imaging module 14 substantially corresponds to the thickness of holding frame portion 1211. In this way, the length in the Z direction of camera module 100 itself can be reduced, that is, the height reduction of camera module 100 can be achieved.

Imaging module 14 includes lens part 141, an imaging device (not illustrated), AF actuator 142, and imaging-module print wiring board 143.

The imaging device (not illustrated) is composed of, for example, a CCD (charge coupled device) image sensor, a CMOS (complementary metal oxide semiconductor) image sensor, or the like. The imaging device (not illustrated) is mounted to imaging-module print wiring board 143. The imaging device (not illustrated) captures a subject image imaged by lens part 141.

AF actuator 142 includes an AF voice coil motor, for example, and moves lens part 141 in the optical axis direction by utilizing the driving force of AF voice coil motor. Publicly known techniques can be applied to AF actuator 142.

Imaging-module print wiring board 143 is here composed of flexible printed circuits having flexibility. Imaging-module print wiring board 143 includes a power-source line (not illustrated) configured to feed power to a coil part (not illustrated) of AF actuator 142, and a video signal line (not illustrated) for video signals output from the imaging device. As illustrated in FIG. 7, imaging-module print wiring board 143 is pulled to the outside through drawing port 115b of cover member 115 from the inside of skirt member 114 and over skirt member 114 in the state where imaging module 14 is mounted in OIS actuator A. In this embodiment, the portion of imaging-module print wiring board 143 getting over skirt member 114 corresponds to portion 143a bifurcated from the inside of skirt member 114 as illustrated in FIG. 5. To be more specific, imaging-module print wiring board 143 extends out upwardly from the underside of imaging module 14, is bent to extend outwardly of a skirt portion, and then extends out from drawing port 115b of cover member 115. Imaging-module print wiring board 143 pulled out is connected to rigid FPC 117 of fixing part 11. As described above, imaging-module print wiring board 143 is flexible, and therefore does not disturb the movement of movable part 12 although imaging-module print wiring board 143 is provided in movable part 12. In the meantime, branching may be provided in imaging-module print wiring board 143 to equip the power-source line and the video signal line with different connectors.

In OIS actuator A, the magnetic circuit part including magnet part 122 (permanent magnets 122A to 122D) and coil part 112 (tilt coils 112A to 112D) is disposed on base member 111 peripherally with respect to the lower end of imaging module 14 and holding frame portion 1211 of yoke 120 in the X and Y directions.

The magnetic circuit part is disposed at such a position that a part of the magnetic circuit part overlaps the lower end of imaging module 14 and holding frame portion 1211 of yoke 120 in the X and Y directions. In other words, the magnetic circuit part is disposed at such a position that one of magnet part 122 and coil part 112 (in this case, magnet part 122) overlaps the lower end of imaging module 14 and holding frame portion 1211 of yoke 120 in the X and Y directions. In this embodiment, permanent magnets 122A to 122D constituting magnet part 122 are disposed above tilt coils 112A to 112D constituting coil part 112 in such a manner as to be partially inserted inside tilt coils 112A to 112D. In this manner, permanent magnets 122A to 122D are disposed above respective tilt coils 112A to 112D along the winding axes directions of respective tilt coils 112A to 112D (Z direction).

In the OIS voice coil motor including magnet part 122 and coil part 112 disposed as described above, in an initial state where no current flows through coil part 112, imaging module 14 (movable part 12) is held at a neutral position where the optical axis coincides with the Z direction. In this respect, in a case where imaging module 14 (movable part 12) is offset from the neutral position due to dead weight sagging or the like when movable body 12 is attached to fixing part 11, the position of movable part 12 is corrected using the offset position detected by displacement detection part 40 to the neutral position where the optical axis coincides with the Z direction.

When a current flows through coil part 112, a Lorentz force in the Z direction is generated at coil part 112 by interaction between the magnetic field of magnet part 122 and the current flowing through coil part 112 (Fleming's left hand rule). Since coil part 112 is fixed, a reactive force is exerted on magnet part 122 that is movable part 12. This reactive force is the driving force of the OIS voice coil motor.

To be more specific, when opposite currents are supplied to tilt coils 112A and 112C facing each other in the X-axis direction, opposite forces in the Z direction act on permanent magnets 122A and 122C. Accordingly, movable part 12 including imaging module 14 rotationally sways around the Y-axis with center portion 13a of elastic supporting part 13 as a fulcrum. Likewise, when opposite currents are supplied through tilt coils 112B and 112D facing each other in the Y-axis direction, movable part 12 including imaging module 14 rotationally sways around the X-axis with center portion 13a of elastic supporting part 13 as a fulcrum. Movable part 12 rotationally sways until the driving force of the OIS voice coil motor (force which acts on magnet part 122) and the restoration force of elastic supporting part 13 become equivalent to each other.

At this time, the current for energization of coil part 112 is controlled based on the detection result of displacement detection part 40 such that rotational sway of movable part 12 cancels out the shake of imaging module 14. In this manner, the shift of the optical axis due to hand shake is corrected, and the orientation of the optical axis is kept at an orientation.

In addition, since restriction part 114d of skirt member 114 limits the rotational sway of movable part 12, it is possible to prevent movable part 12 from being excessively rotationally swayed by the drop impact or the like.

Shake detection part 15 is mounted on rigid FPC 117 via intermediary substrate 30, and detects shake (in particular, tilt) of rigid FPC 117, that is, shake (movement) of camera module 100. Shake detection part 15 is composed of a gyro sensor which is configured to detect the angular velocity of, for example, camera module 100, that is, electronic equipment on which camera module 100 is mounted (in this case, smartphone). Shake detection part 15 can detect shake at least in the directions of two axes (X- and Y-axes) perpendicular to optical axis O, and in this embodiment, shake detection part 15 can detect shake in the directions of the Z- (the optical axis is also included), X-, and Y-axes.

A detection signal obtained by shake detection part 15 (signal indicating the shake and/or tilt of rigid FPC 117) is output to the control part via intermediary substrate 30 and rigid FPC 117. The control part controls the current for energization of coil part 112 via driver IC 60 based on this detection signal and on a detection signal obtained by displacement detection part 40 (Hall elements 40a and 40b). In this respect, the control part (not illustrated) may be mounted on imaging-module print wiring board 143 or on rigid FPC 117. In addition, a control part mounted in smartphone M may be utilized via the print wiring board.

Figure 9A:
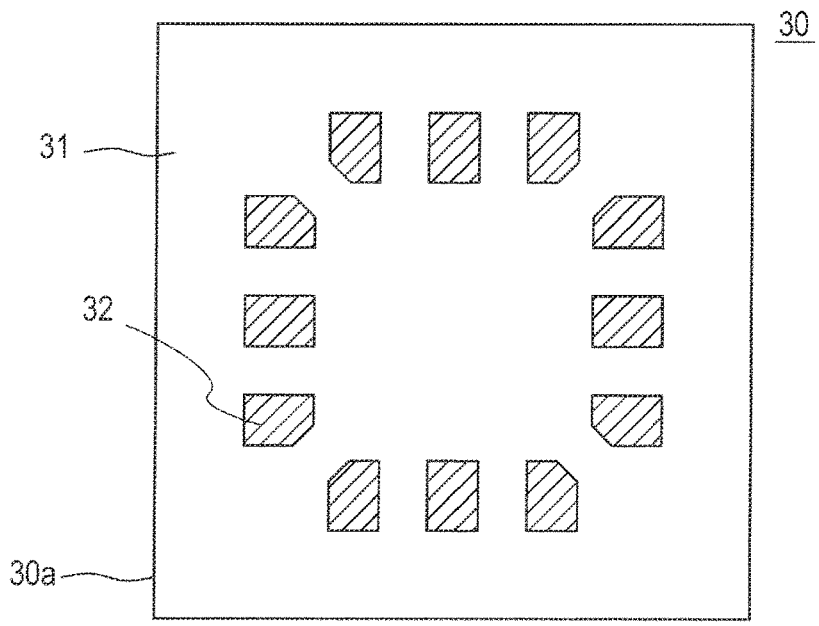
FIGS. 9A to 9C are an explanatory view for an intermediary substrate.
Figure 9B:
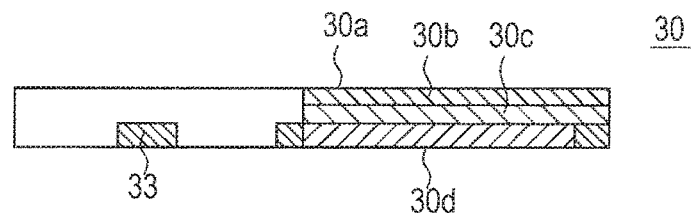
Figure 9C:
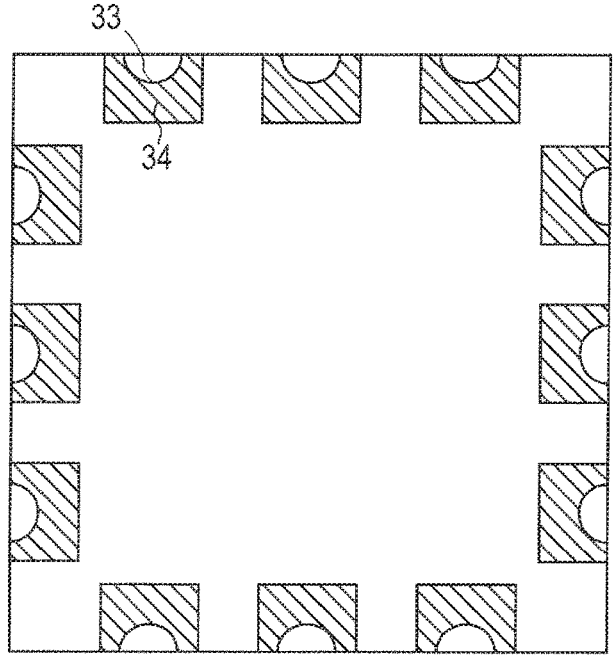

FIGS. 9A to 9C are an explanatory view for intermediary substrate 30, and FIG. 9A is a plan view of intermediary substrate 30, FIG. 9B is a fragmentary sectional view of intermediary substrate 30, and FIG. 9C is a bottom view of the intermediary substrate.

Intermediary substrate 30 is mounted on rigid FPC 117 while being making surface contact with rigid FPC 117, and the gyro sensor serving as shake detection part 15 is mounted on surface 30a of intermediary substrate 30.

Intermediary substrate 30 is formed of a material which has rigidity greater than that of rigid FPC 117 and does not deform conformably to the deformed shape of rigid FPC 117. It is desirable that intermediary substrate 30 be thermally and electrically insulating. Intermediary substrate 30 is a ceramic substrate, for example, and it is preferable that both of thermally-and-electrically-insulating front and back surfaces of intermediary substrate 30 be formed as a smooth flat surface. Intermediary substrate 30 electrically connects the gyro sensor serving as shake detection part 15 with a circuit pattern of rigid FPC 117.

In intermediary substrate 30, pads 32 corresponding to output terminals or fixed terminals of the gyro sensor are formed on front surface 31, and external terminal parts 33 connected to pads 32 on front surface 31 are formed on the rear surface side. Intermediary substrate 30 is a ceramic substrate, and accordingly intermediary substrate 30 can be configured to be thermally and electrically insulating and to be thick. In addition, in the case of a ceramic substrate, an electrode can be formed on the main body of the substrate by electrode plating process. In this embodiment, intermediary substrate 30 is formed of a plurality of layers and formed rectangularly in plan view, and intermediary substrate 30 includes front surface layer 30a constituting front surface 31, two intermediate layers 30b and 30c, and rear surface layer 30d.

Pads and interconnections are formed in each of layers 30a to 30d, and the respective pads and interconnections in layers 30a to 30d are connected correspondingly to one another in the thickness direction. In particular, semicircular cutouts are formed at the outer peripheries of intermediate layer 30c and of rear surface layer 30d. External terminal parts 33 are formed by the electrode plating process (for example, gold-plating) to these cutouts. That is, external terminal parts 33 are connected to respective pads 32 on front surface 31 via the interconnections and/or pads of each of layers 30a to 30d.

These external terminal parts 33 have the shape of a circular arc opening laterally, so that a terminal can be disposed in this circular arc, that is, can be connected at the lateral side of intermediary substrate 30. External terminal parts 33 can thus be disposed on corresponding circuit patterns of rigid FPC 117 and connection can easily be formed by solder laterally from external terminal parts 33.

Intermediary substrate 30 is thus interposed between rigid FPC 117 and the gyro sensor serving as shake detection part 15, and connects shake detection part (gyro sensor) 15 to the circuit patterns of rigid FPC 117 corresponding to the output terminals of shake detection part 15 in the thickness direction of intermediary substrate 30.

In the present embodiment, shake detection part (gyro sensor) 15 is mounted on rigid FPC 117 of camera module 100 instead of providing shake detection part 15 to a side surface of imaging module 14, and a hand-shake angle, that is, the angle of camera module 100 itself is detected and output to the control part. The control part controls the current for energization of coil part 112 via driver IC 60 to be able to obtain an output from Hall elements 40a and 40b (Hall output value) corresponding to the angle, and moves (tilts) movable part 12 to correct the shake.

Figure 10:
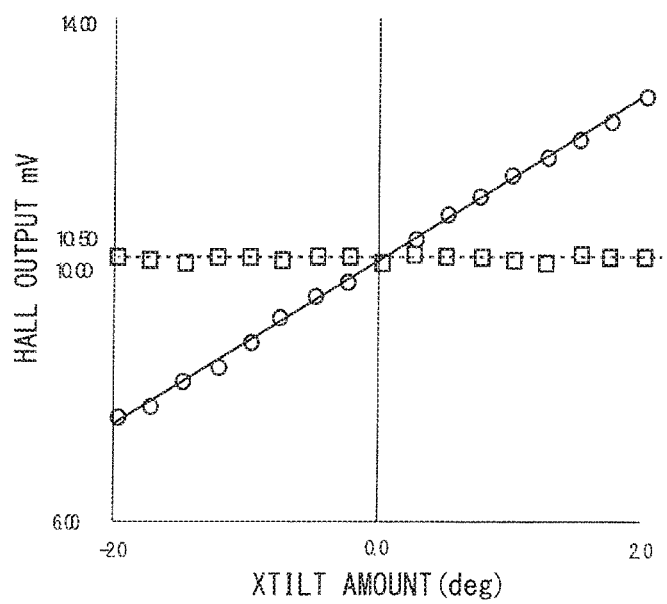
FIG. 10 illustrates the relationship between an angle of a movable part and Hall output values.

FIG. 10 is a graph for explanation of the relationship between the angle of movable part 12 (which means the same as the angle of the imaging module fixed by movable part 12) and the Hall output values. In FIG. 10, the symbol of "○" indicates a value detected in the X-axis direction to which a correction value is added, and the symbol of "□" indicates a value detected in the Y-axis direction to which a correction value is added.

As illustrated in FIG. 10, the outputs of Hall elements 40a and 40b and an xtilt amount (which denotes an amount of movement about the X-axis, in particular, a tilt amount about the X-axis) have a relationship to be plotted linearly, while some of the plots may be offset from the linear relationship. Likewise, the outputs of Hall elements 40a and 40b and a ytilt amount (which denotes an amount of movement about the Y-axis, in particular, a tilt amount about the Y-axis) also have a relationship to be plotted linearly.

In the present embodiment, the Hall output values to be output by Hall elements 40a and 40b thus mean the movement amounts of movable part 12 (imaging module 14) in the directions of X- and Y-axes based on the tilt amount of movable part 12 tilting about the Y-axis and the tilt amount of movable part 12 tilting about the X-axis. Based on this relationship, the actual shake of imaging module 14 is computed from the output values to be output by Hall elements 40a and 40b, imaging module 14 is moved and the shake of imaging module 14 is corrected using the output values. That is, the use of an angle to be detected by shake detection part 15 and a detection position to be obtained by Hall elements 40a and 40b allows correction of a tilt angle of imaging module 14. This correction is implemented by moving (tilting) movable part 12 (module 14) such that an output value (detection position) of the Hall elements corresponding to the tilt angle (xtilt amount and ytilt amount) of imaging module 14 provided to movable part 12 can be obtained, the tilt angle corresponding to the angle of rigid FPC 117 itself provided to fixing part 11 detected by shake detection part 15 that is a gyro sensor.

OIS actuator A of the present embodiment includes the gyro sensor serving as shake detection part 15, and in OIS actuator A, shake correction is implemented by using the tilt (shake) of rigid FPC 117 to be detected by the gyro sensor so as to tilt, by the driving force of the voice coil motor including coil part 112 and magnet part 122, imaging module (driven part) 14 that is supported to be freely movable and supported to be spaced apart from rigid FPC 117 via elastic supporting part (supporting part) 13.

To be specific, in OIS actuator A, one of coil part 112 and magnet part 122 is disposed to movable part 12, the other one of coil part 112 and magnet part 122 is disposed to fixing part 11, and movable part 12 is allowed to move with respect to fixing part 11 in the X-axis direction (first direction) and Y-axis direction (second direction). In addition, OIS actuator A includes rigid FPC 117 on which the gyro sensor serving as shake detection part 15 is mounted, elastic supporting part 13 supporting imaging module 14 such that imaging module 14 is spaced apart from rigid FPC 117 and is freely movable, Hall elements (position detection part) 40a and 40b configured to detect an X-axial position (first position) resulted from the movement in the X-axis direction (first direction) orthogonal to the optical axis direction (direction in which imaging module 14 faces toward rigid FPC 117), and a Y-axial position (second position) resulted from the movement of Y-axis direction (second direction) orthogonal to the X-axis position, and the voice coil motor including coil part 112 and magnet part 122. In OIS actuator A, on the basis of tilt of rigid FPC 117 and X-axial and Y-axial positions (detection position) of imaging module 14, shake correction is implemented by tilting imaging module 14 using the driving force of the voice coil motor including coil part 112 and magnet part 122.

In the meantime, in mobile terminals and the like, a configuration is adopted in which a rigid FPC is employed as a circuit board on which an imaging module and the like are mounted, in the same manner as in the present embodiment. As for the rigid FPC, along with the thickness reduction of the mobile terminal, it has been desired in recent years to further limit the height of a camera module, that is, to further reduce the height of the camera module. From the viewpoint of limiting the height of a mounting space, not only the height reduction of components to be mounted, such as an imaging module and the like, but also the thinning of the rigid FPC itself on which a gyro sensor (for the Z-axis) is mounted in the camera module is to be considered. It has been, however, known that the rigidity of the rigid FPC decreases and the rigid FPC is easily warped when the rigid FPC on which the camera module and/or the gyro sensor is mounted is thinned for the height reduction of the camera module in conventional structures in which the camera module can be supported aslant. Accordingly, the thinning of rigid FPC entails a risk that an external stress is applied in the gyro sensor mounted on the rigid FPC due to a warp of the rigid FPC itself, and this external stress then causes the output of the gyro sensor to be offset, thereby worsening the characteristics of the gyro sensor. Accordingly, it has been desired to achieve the height reduction without any external stress being applied even when the rigid FPC is thinned in the camera device including the rigid FPC on which the gyro sensor is mounted.

In the present embodiment, the gyro sensor serving as shake detection part 15 is mounted on rigid FPC 117 via intermediary substrate 30 whose rigidity is greater than that of rigid FPC 117. By way of example, the shake of imaging module 14 may cause stress in the bifurcated portion of imaging-module print wiring board 143 (portion 143*a* extending over skirt member 114 within cover member 115), and the stress may then be transmitted to rigid FPC 117, thereby causing rigid FPC 117 to be deformed and warped. Even in such a case, intermediary substrate 30 is not deformed conformably to the deformed shape of rigid FPC 117 since intermediary substrate 30 has a greater rigidity than rigid FPC 117. In addition, intermediary substrate 30 reduces the deformation of rigid FPC 117 itself. In this way, intermediary substrate 30 maintains a connection condition between the circuit pattern of rigid FPC 117 and external terminal parts 33, maintains its flat front and rear surfaces, and prevents the occurrence of the external stress in the gyro sensor that is shake detection part 15.

In this way, the output of shake detection part (gyro sensor) 15 is not offset, and the output characteristics can be prevented from worsening.

In contrast to the conventional mounting construction of the gyro sensor in which the gyro sensor is mounted directly on the rigid FPC, the gyro sensor is mounted on rigid FPC 117 via intermediary substrate 30 (in this embodiment, ceramic substrate). As for a method for mounting, the gyro sensor that is shake detection part 15 can be mounted on intermediary substrate 30, and subsequently on rigid FPC 117, for example.

According to the present embodiment, limiting the overall height of the OIS camera module, that is, the height reduction of the OIS camera module can thus be implemented while the characteristics of the shake detection part (gyro sensor) is maintained without any external stress being applied in shake detection part (gyro sensor) 15 even when rigid FPC 117 is thinned (for example, to a thickness of 0.2 mm or smaller). This makes it possible to dispose other circuit boards above this OIS camera module, that is, above shake detection part (gyro sensor) 15, driver IC 60, and the like on rigid FPC 117 such that the other circuit boards are stacked thereabove, so that the miniaturization and/or height reduction of electronic equipment, such as a mobile terminal, on which the OIS camera module is mounted can be achieved.

In the meanwhile, components to be mounted, such as driver IC 60, chip parts, and the like may also be mounted on rigid FPC 117 via intermediary substrate 30. In this manner, it is made possible, in the same manner as in the case where shake detection part 15 is mounted on rigid FPC 117 via intermediary substrate 15, to prevent the occurrence of an external stress in the components mounted on intermediary substrate 30 even when rigid FPC 117 is deformed (warped).

In addition, when a gyro sensor is attached to the side surface of AF actuator 142, heat generated during driving of AF actuator 142 may be transmitted to the gyro sensor to create a possibility of temperature drift depending on the magnitude of the generated heat. In contrast to this, such drift can be avoided.

In the meanwhile, mounting of shake detection part 15 on intermediary substrate 30 or mounting of intermediary substrate 30 on rigid FPC 117 may be performed using a solder paste that electrically connects them to each other.

Figure 1:
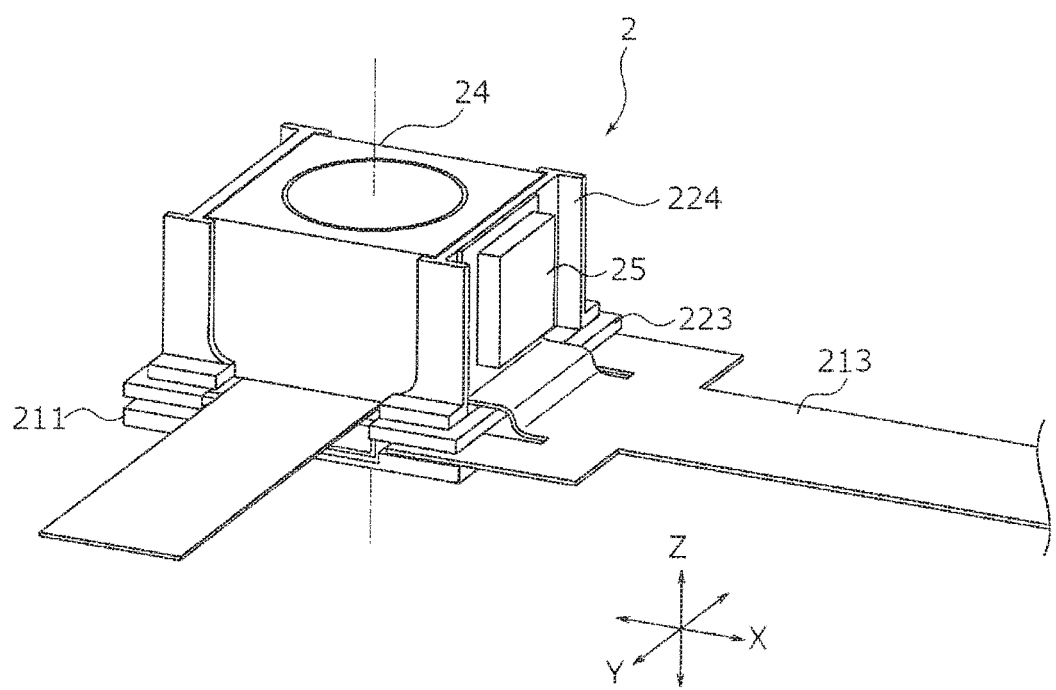
FIG. 1 is an external view of an exemplary camera module of a traditional module tilt type.
Figure 2:
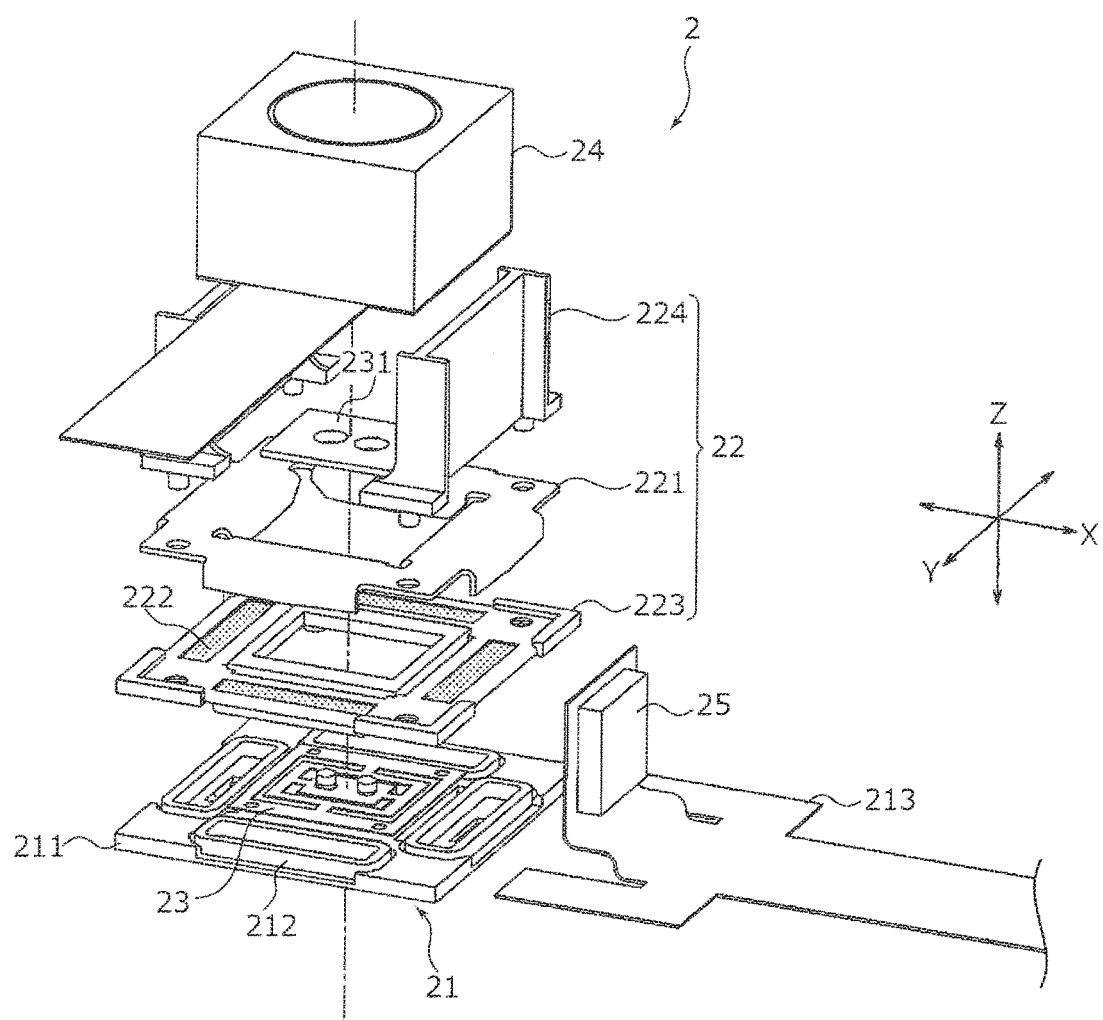
FIG. 2 is an exploded perspective view of the exemplary camera module of a traditional module tilt type.

In addition, in traditional camera module 2 (see FIGS. 1 and 2), shake detection part 25 is attached to movable part 22 (module guide 224), and the detection signal of shake detection part 25 is output through OIS print wiring board 213 serving as fixing part 21. The rotational sway of movable part 22 is inhibited by OIS print wiring board 213, and the sensitivity of the tilt operation is reduced, and as a result, the driving force of the OIS actuator is inevitably increased.

In contrast, in camera module 100 according to the embodiment, shake detection part 15 is not attached to movable part 12 (in particular, to imaging module 14), but is mounted on rigid FPC 117 of fixing part 11. In this respect, tilt detection of imaging module 14 in camera module 100 is not carried out by shake detection part 15, but shake detection part 15 detects tilt of camera module 100 itself to obtain a shake angle, and the current for energization of coil part 122 is controlled by means of driver IC 60 to move movable part 12 such that a detection value (Hall output value) corresponding to this shake angle can be detected by displacement detection part 40.

In this way, shake correction can be implemented without shake detection part (gyro sensor) 15 being attached to imaging module 14.

In addition, an FPC for mounting shake detection part (gyro sensor) 15 is not necessary, so that processing steps can be reduced. Regarding setting of a motion space of imaging module 14 movable within skirt member 11, the motion space of imaging module 14 can be enlarged and the range of shake correction can be wider since shake detection part 15 is not mounted on imaging module 14.

In addition, OIS print wiring board 113 of fixing part 11 can be used only for power feeding to coil part 112, and therefore may be omitted by separately providing another power-source line. Consequently, cost reduction and space-saving can be achieved.

In addition, yoke 120 includes a step by which holding frame portion 1211 of imaging module 14 is made closer to base member 111 than top plate portion 121*a* of one of coil part 112 and magnet part 122 is to base member 111. Thus, the placement region in yoke 120 for imaging module 14 can be lower than the disposition region for coil part 112 or magnet part 122, and therefore further height reduction can be more surely achieved. At the same time, the height of the magnetic circuit part, that is, the lengths of coil part 112 and magnet part 122 are not limited, and accordingly a decrease in the magnetic efficiency and an accompanying increase in the power consumption are not caused. To be specific, it is possible to secure, for the space in the height direction required for construction of the magnetic circuit part, the space where shake detection part 15 is not attached to the side surface of imaging module 14, and accordingly the construction of the magnetic circuit part itself can be larger in the height direction by spaciously utilizing the peripheral space of imaging module 14. For example, the height (length in the Z direction) of coil part 112 can be greater by increasing the number of turns of coil part 112 (tilt coils 112A to 112D), or the length in the Z direction of magnet part 122 (permanent magnets 122A to 122D) can be increased. In this way, the magnetic force can be greater, so that it is possible to improve the magnetic efficiency and/or to reduce the power consumption.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, while the actuator of the embodiment is of a so-called moving magnet type in which fixing part 11 includes coil part 112 and movable part 12 includes magnet part 122, the present invention may be applied to an actuator of a so-called moving coil type in which a fixing part includes a magnet part and a movable part includes a coil part. In this case, a yoke is also disposed to the fixing part.

While, in the embodiment, two pairs of tilt coil 112A and permanent magnet 122A and tilt coil 112C and permanent magnet 122C are disposed as the voice coil motor that rotationally sways movable part 12 around the X-axis, and two pairs of tilt coil 112B and permanent magnet 122B and tilt coil 112D and permanent magnet 122D are disposed as the voice coil motor that rotationally sways movable part 12 around the Y-axis, it suffices that at least one pair is disposed as each of the voice coil motors.

Displacement detection part 40 is disposed on fixing part 11 in such a manner as to face the bottom surface of movable part 12. In this way, displacement detection part 40 enables shake correction while reducing an occupancy space as much as possible.

In addition, preferably, each component (in particular, magnet part 122) of actuator A is formed of a highly heat-resistant material. Soldering of a reflow type can thus be employed. In addition, as a countermeasure against noise, a conductive shield case may be provided on the outside of camera module 100.

Figure 11A:
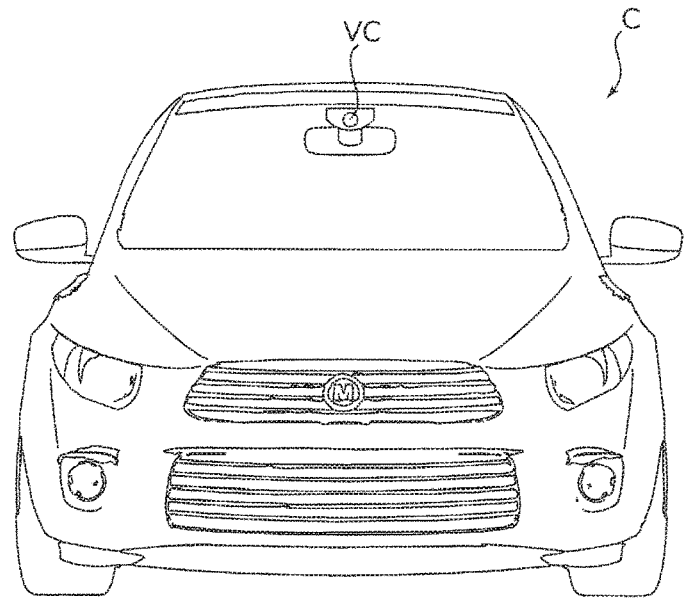
FIGS. 11A and 11B illustrate an automobile in which an onboard camera according to one embodiment of the invention is mounted.
Figure 11B:
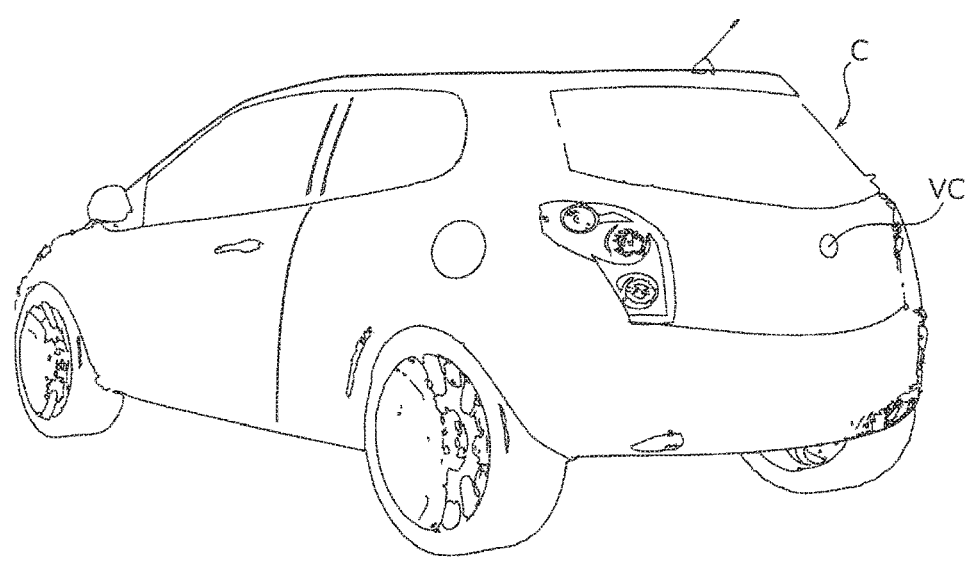

While a smartphone that is a camera-equipped mobile terminal is described in the embodiment as an example of the camera-mounted device having camera module 100, the present invention is also applicable to a camera-mounted device that is an information device or transporting device. For example, the present invention is also applicable to camera-equipped mobile phones, note-type personal computers, tablet terminals, mobile game machines, web cameras, and the like as a camera-mounted device. The present invention is also applicable to automobiles, camera-equipped onboard devices (for example, rear monitoring device or drive recorder), or the like as a camera-mounted device. FIGS. 11A and 11B illustrate vehicle C in which onboard camera module VC (Vehicle Camera) is mounted. FIG. 11A is a front view of vehicle C and FIG. 11B is a rear perspective view of vehicle C. Camera module 100 as described in the embodiment is mounted on vehicle C as onboard camera module VC, for example. Onboard camera module VC is used for rear monitoring, drive recording, collision avoidance control, automatic drive control, and the like.

The embodiment disclosed herein is merely an exemplification in every respect and should not be considered as limitative. The scope of the present invention is specified by the following claims, not by the above-mentioned description. The scope of the present invention is intended to include all modifications in so far as they are within the scope of the appended claims or the equivalents thereof.

This application is entitled to and claims the benefit of Japanese Patent Application No. 2015-110562 dated May 29, 2015 and Japanese Patent Application No. 2015-129096 dated Jun. 26, 2015, the disclosures of which each including the specification, drawings and abstract are incorporated herein by reference in their entirety.

REFERENCE SIGNS LIST

11 Fixing part
12 Movable part
13 Elastic supporting part (supporting part)
13a Center portion
13b Inner gimbal
13c Outer gimbal
14 Imaging module (driven part)
15 Shake detection part
30 Intermediary substrate
31 Front surface
32 Pad
33 External terminal part
40 Displacement detection part
40a, 40b Hall elements
60 Driver IC
100 Camera module
111 Base member
111a Protruding part
112 Coil part
112A, 112B, 112C, 112D Tilt coils
113 OIS print wiring board
114 Skirt member (cover member)
114a Reception port
114d Restriction part
115 Cover member
115a Opening
117 Rigid FPC (Fixing Part)
121b Outside droop portion
121c Inside droop portion
122 Magnet part
122A, 122B, 122C, 122D Permanent magnets
141 Lens part
142 AF actuator

The invention claimed is:

1. An actuator configured to correct shake by tilting a driven part with a driving force of a voice coil motor including a coil part and a magnet part, the actuator comprising:
   a fixing part which includes a base member, wherein one of the coil part and the magnet part is disposed on the base member peripherally with respect to the driven part;
   a movable part including a frame-shaped holding member having a surface which faces away from the base member and on which the driven part is placed, the movable part being a part in which the other one of the coil part and the magnet part is disposed peripherally with respect to the driven part and on a surface of the frame-shaped holding member facing the base member; and a supporting part disposed to the base member, and configured to support the movable part such that the movable part is tiltable with respect to the fixing part, wherein:
- the fixing part is provided with: a gyro sensor configured to detect a shake of the fixing part, a first Hall element configured to detect a first position resulted from a movement in a first direction orthogonal to an optical axis of a lens part provided to the driven part, and a second Hall element configured to detect a second position resulted from a movement in a second direction orthogonal to the first direction; and
- the detected shake of the driven part is corrected based on the shake of the fixing part detected by the gyro sensor and on a detection position obtained by the first and the second Hall elements: and,
- the frame-shaped holding member includes:
  - a flat frame-shaped holding frame portion to which a bottom surface of the driven part is fastened; and
  - a holding-part main body provided peripherally from an outer edge of the frame-shaped holding frame portion and formed in a recessed shape, the recessed shape opening toward the base member and including, inside the recessed shape, a bottom surface located more distant from the base member than the frame-shaped holding frame portion is from the base member, wherein:
    - the holding-part main body fixedly holds the one of the coil part and the magnet part at the bottom surface.

2. The actuator according to claim 1, wherein:
the frame-shaped holding member includes a step by which a placement region for the driven part is made closer to the base member than a disposition region for the one of the coil part and the magnet part is to the base member.

3. The actuator according to claim 1, wherein:
the frame-shaped holding member is a yoke formed of a magnetic material.

4. The actuator according to claim 1, wherein:
the fixing part further includes a frame-shaped cover member fixed to a peripheral edge of the base member; and
the movable part is set between the base member and the frame-shaped cover member.

5. The actuator according to claim 1, wherein:
the coil part is disposed such that a winding axis of the coil part is oriented in a direction in which the base member and the frame-shaped holding member face each other; and
the magnet part is disposed to protrude to a central portion of the coil part.

6. A camera module comprising:
an actuator according to claim 1; and
an imaging module including a lens part and an imaging device, the imaging module being the driven part and being bonded to the frame-shaped holding member.

7. The camera module according to claim 6 further comprising:
a control part configured to control power feeding to the coil part based on a detection signal to be output from the gyro sensor.

8. A camera module, comprising:
an actuator according to claim 1; and
an imaging module including a lens part and an imaging device, the imaging module being the driven part.

9. The camera module according to claim 8, wherein:
the imaging module has an auto-focusing function.

10. A camera-mounted device that is an information device or a transporting device, the camera-mounted device comprising:
a camera module according to claim 8.

11. An actuator configured to correct shake by tilting a driven part with a driving force of a voice coil motor including a coil part and a magnet part, the actuator comprising:
- a fixing part which includes a base member, wherein one of the coil part and the magnet part is disposed on the base member peripherally with respect to the driven part;
- a movable part including a frame-shaped holding member having a surface which faces away from the base member and on which the driven part is placed, the movable part being a part in which the other one of the coil part and the magnet part is disposed peripherally with respect to the driven part and on a surface of the frame-shaped holding member facing the base member; and
- a supporting part disposed to the base member, and configured to support the movable part such that the movable part is tiltable with respect to the fixing part, wherein:
- the fixing part is provided with:
  - a gyro sensor configured to detect shake of the fixing part, a first Hall element configured to detect a first position resulted from a movement in a first direction orthogonal to an optical axis of a lens part provided to the driven part, and
  - a second Hall element configured to detect a second position resulted from a movement in a second direction orthogonal to the first direction; and
- the detected shake of the driven part is corrected based on the shake of the fixing part detected by the gyro sensor and on a detection position obtained by the first and the second Hall elements,
wherein:
- the fixing part includes a rigid-flexible printed circuit on which the first and the second Hall elements are mounted, and
- the gyro sensor is mounted on the rigid-flexible printed circuit via an intermediary substrate having a greater rigidity than the rigid-flexible printed circuit,
- wherein the intermediary substrate includes a terminal part formed to be recessed at an outer peripheral edge of the intermediary substrate on a surface side of the intermediary substrate making contact with the rigid-flexible printed circuit, the terminal part being configured to be connected to the gyro sensor mounted on the intermediary substrate.

12. The actuator according to claim 11, wherein:
the intermediary substrate is a ceramic substrate.

13. The actuator according to claim 11, wherein:
the intermediary substrate is provided to the rigid-flexible printed circuit in such a manner as to make surface contact with the rigid-flexible printed circuit.

* * * * *